United States Patent [19]
Urlaub et al.

[11] 4,294,206
[45] Oct. 13, 1981

[54] COMBUSTION METHOD AND DEVICE FOR PRACTICING SAME

[75] Inventors: Alfred Urlaub; Franz Chmela, both of Nuremberg, Fed. Rep. of Germany

[73] Assignee: Maschinenfabrik Augsburg-Nürnberg Aktiengesellschaft, Nuremberg, Fed. Rep. of Germany

[21] Appl. No.: 55,761

[22] Filed: Jul. 9, 1979

Related U.S. Application Data

[63] Continuation of Ser. No. 779,754, Mar. 21, 1977, abandoned.

[30] Foreign Application Priority Data

Mar. 19, 1976 [DE] Fed. Rep. of Germany ....... 2611624

[51] Int. Cl.³ ..................... F02B 19/08; F02B 19/16
[52] U.S. Cl. ................................. 123/276; 123/263
[58] Field of Search ................ 123/30 C, 30 D, 32 A, 123/32 SA, 32 ST

[56] References Cited

U.S. PATENT DOCUMENTS

| | | | |
|---|---|---|---|
| 2,125,293 | 8/1938 | Hesselman | 123/32 SA |
| 3,094,974 | 6/1963 | Barber | 123/30 C |
| 3,107,658 | 10/1963 | Meurer | 123/32 ST |
| 3,534,714 | 10/1970 | Urlaub | 123/32 SA |
| 3,828,739 | 8/1974 | Finsterwalder | 123/32 SA X |

FOREIGN PATENT DOCUMENTS

| | | | |
|---|---|---|---|
| 2125517 | 2/1973 | Fed. Rep. of Germany | 123/32 A |
| 1276938 | 10/1961 | France | 123/30 D |
| 1534228 | 6/1968 | France | 123/32 A |

*Primary Examiner*—Michael Koczo, Jr.
*Attorney, Agent, or Firm*—Becker & Becker, Inc.

[57] ABSTRACT

A combustion process and apparatus for a spark ignited air compressing internal combustion engine with direct injection of the major portion of the fuel onto the wall of the combustion chamber provided in the piston in the form of a body of revolution, according to which a rotary motion is imparted upon the inflowing air in such a way that the fuel is gradually released from the combustion chamber wall and mixed with the air in the form of vapors. The injection nozzle is positioned in the cylinder head near the combustion chamber throat while the ignition device extends into the combustion chamber at the top dead center position of the piston. The fuel is injected onto the combustion chamber wall by means of a jet from which individual small fuel particles are detached which are immediately mixed with the air on being emitted from the injection nozzle opening. The small amount of combustible mixture formed by the fuel particles detached from the fuel jet and not yet conveyed by the centrifugal forces onto the wall is toward the end of the injection phase ignited close to the injection nozzle opening by the ignition device. The thus initiated combustion propagates in the direction of the revolving air across to the fuel film existing on the wall of the combustion chamber in the piston. Subsequently the main combustion takes place in conformity with the progress of the mixture of the fuel vapors generated in the wall region with the air circulating in the combustion chamber.

8 Claims, 3 Drawing Figures

COMBUSTION METHOD AND DEVICE FOR PRACTICING SAME

This is a continuation of application Ser. No. 779,754 - Urlaub et al filed Mar. 21, 1977, now abandoned.

The present invention relates to a combustion process and apparatus for implementing said process for a spark-ignition air-compressing internal-combustion engine with direct injection of the major portion of the fuel charge onto the wall of a combustion chamber in the shape of a solid of revolution in the piston where a rotary motion is imparted upon the inflowing air so that the fuel is thereby gradually removed in the vapor state from the combustion chamber wall and mixed with air, the injector being located in the cylinder head near the combustion chamber throat and the ignition device extending into the combustion chamber at the top dead center position of the piston.

A similar internal combustion engine using a process of applying the fuel to the wall has been disclosed in German Pat. No. 1 576 020. In that engine, the ignition device is arranged diametrically opposite the injection close to the combustion chamber wall and preferably designed as a single-pole pin electrode which extends into the combustion chamber at top dead center of the piston and disposed parallel with the combustion chamber wallop because the latter forms the other pole. Of course, it is also possible to provide two rod electrodes arranged in parallel each of which forms one pole.

The fuel is sprayed onto the combustion chamber wall by means of one or a plurality of jets so that due to its kinetic energy and the effect of the rotating air flow, it will spread as a thin film which, looking in the direction of rotation of the air, is located in front of the electrode or electrodes and ends in the area of or a short distance behind said electrode or electrodes. As a result of the rotary motion of the air, the fuel is detached in the vapor state from the combustion chamber wall and prepared together with the air to form a combustible mixture of which a part passes between the electrodes and is ignited. Since it is practically impossible to achieve a readily ignitable mixture in all load ranges of the engine at an accurately defined spark path, the electrode or electrodes extend relatively far into the combustion chamber so that the spark jumping across can choose the location where the most favorable mixture composition exists and, consequently, the voltage is at its minimum.

Furthermore, the patent referred to proposes in order to positively obtain an ignitable mixture at the electrodes, to provide a weir edge in the vicinity of the electrodes on the combustion chamber wall whereby a certain fuel accumulation is brought about.

This type of internal-combustion engine where the fuel detached from the combustion chamber wall and prepared to form an ignitable mixture is ignited directly, offers an advantage over designs known up to that date in that reliable ignition takes place in all operating ranges and that the ignition timing can be appropriately adjusted for the values required to achieve good engine performance.

In the meantime, it has been found that this engine, too, requires improvement. For instance, the electrodes, in order to reach the fuel film with the fuel jet orientations required for an efficient combustion pattern, have to extend over a length of approximately 50% of the maximum combustion chamber diameter in the piston, in other words relatively deep into the combustion chamber. As a result thereof, the electrodes burn up quickly and thus can no longer perform their function. Furthermore, in the case of fuel jet orientations which have proved optimum for emission control and where film formation takes place more in the lower part of the combustion chamber wall in the piston, reliable mixture ignition under all operating conditions is not insured without a further extension of the electrodes - which is most detrimental to their service life.

Added to this is the fact that, in the case of two-pole spark plugs, satisfactory ignition is only possible if, the two electrodes are disposed relative to each other in a radial or substantially radial direction in the combustion chamber whereby it is necessary to accurately locate the spark plugs, which involves costs. Finally, it has been found that in the case of water-cooled engines difficulties are liable to be encountered in the physical design if the ignition devices are arranged opposite the injection device.

It is, therefore, an object of the present invention to overcome the above mentioned disadvantages and for an internal-combustion engine of the general type described above with wall deposition of the fuel to provide both a new combustion process and an apparatus to implement said process, which will make it possible, without any great wear of the ignition device and without substantial engineering expense, to achieve reliable ignition and optimum combustion of the mixture prepared in all operating ranges and, consequently, to obtain optimum engine performance. In other words, it is intended to provide an improved version of the known process.

These and other objects and advantages of the invention will appear more clearly from the following specification in connection with the accompanying drawings, in which.

Figure 1:
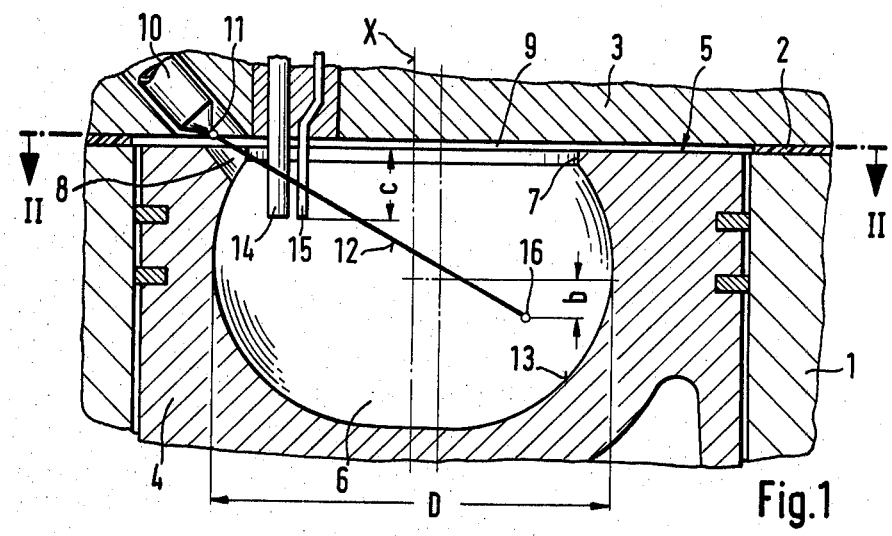
FIG. 1 is a longitudinal section through the upper part of a piston arranged in a cylinder and through the apparatus according to the invention.

The above object of the present invention has been realized according to the invention by applying the fuel to the combustion chamber wall by means of a jet from which individual small fuel particles are separated on the jet leaving the injection nozzle opening and mix directly with the air. The invention is furthermore characterized in that small amounts of combustible mixture produced by the fuel particles separated from the jet and not yet transported by the centrifugal forces to the wall are ignited by the ignition device near the injection nozzle opening, that the combustion so initiated propagates in the direction of the rotating air to the fuel film existing on the combustion chamber wall in the piston, and that then the main combustion proceeds as mixing of the fuel vapors developing in the wall zone with the air rotating in the combustion chamber progresses.

The apparatus for implementing this combustion process primarily consists of a configuration where the ignition device is arranged in the region of the injection nozzle in a manner that it will extend into the combustion chamber at the top dead center position of the piston near the injection nozzle opening between the free fuel jet penetrating the combustion chamber and the combustion chamber wall.

The above features fully solve the object defined. The arrangement of the ignition device in the region of the injection nozzle considerably facilitates the physical design of the cylinder head because the remaining space facing the cylinder remains for accommodating the valves. Since even a very short path of the jet suffices to separate adequate fuel quantities from the surface of the jet to initiate combustion which will be in the region of the combustion chamber throat even if impingement of the fuel is on the lower part of the combustion chamber wall, it is possible to design the electrodes with a relatively short length. Since, furthermore the electrodes are not located in the immediate region of main combustion, heat transfer to the electrodes is much lower, which benefits their burnup resistance. The arrangement of the ignition device between the fuel jet and the combustion chamber wall is most obvious because the fuel particles separating from the fuel jet are thus brought to the spark part of the spark plug by the rotating air flow. Since, as a result of the immediate mixing of the fuel with the air, a combustible mixture is, as is well known, quickly formed, it follows that the ignition device is supplied with an ignitable mixture throughout the whole injection period. As a result, it is possible to time initiation of combustion, which is guaranteed at every engine operating point and effected suitably towards the end of fuel injection, so that suitably matched to the time required for preliminary preparation of the fuel film, an optimum combustion pattern is obtained at all times with regard to the various engine operation parameters.

The ignition device according to the invention primarily consists of two pin electrodes of a type known per se arranged parallel with each other. Alternatively, it is possible to construct the electrode forming one pole of the ignition device with several partial pins which are arranged around the single electrode forming the other pole.

As a further development of the invention it is proposed to adopt a distance between the points where the injection nozzle axis and spark plug axis penetrate through the cylinder head bottom face, of approximately 25 to 30% of the maximum combustion chamber diameter, whereas the point where the fuel jet impinges on the combustion chamber wall at the top dead center position of the piston is placed in the lower half of the combustion chamber as is known per se in self-ignition internal combustion engines and which is readily possible by the new configuration and the new combustion process.

Finally, it is proposed according to the invention to arrange the combustion chamber off center in the piston crown with a view to further simplifying the physical design of the cylinder head.

Referring now to the drawings in detail, in FIG. 1, a cylinder 1, which is only partially depicted, is tightly closed at its upper end by means of a gasket 2 and a cylinder head 3 which is also only partially shown. In the cylinder 1 there is slidably arranged a piston 4 which in its crown has a combustion chamber 6 which is slightly flattened at the bottom. Otherwise, the combustion chamber is spherical, and in this embodiment is offset relative to the center line 17 of the cylinder. Through a constricted throat 7 and a recess 8 for injection of the fuel, the combustion chamber 6 communicates with the interior space 9 of the cylinder.

An injector nozzle 10 is arranged obliquely in the cylinder head 3 in such a way that its injection nozzle opening 11 is positioned roughly in the plane of the bottom face of the cylinder head 3 and on the perimeter of the combustion chamber 6. Through the injection nozzle opening 11 fuel is injected by means of a jet 12 so that, when the piston 4 attains its top dead center position, said jet impinges on the lower half of the combustion chamber wall 13, preferably at a distance b of from 10 to 15% of the maximum combustion chamber diameter D below said diameter, and same spreads to form a thin film. The point where the fuel jet 12 hits the combustion chamber wall 13 is called the jet impingement point 16.

Fitted in the region of the injection nozzle opening 11 in the cylinder head 3 there are two electrodes 14, 15 which are insulated from each other and are disposed parallel to each other and extend with a length of c=25 to 30% of the maximum combustion chamber diameter D vertically into the combustion chamber 6 when the piston 4 has reached its top dead center position.

Figure 2:
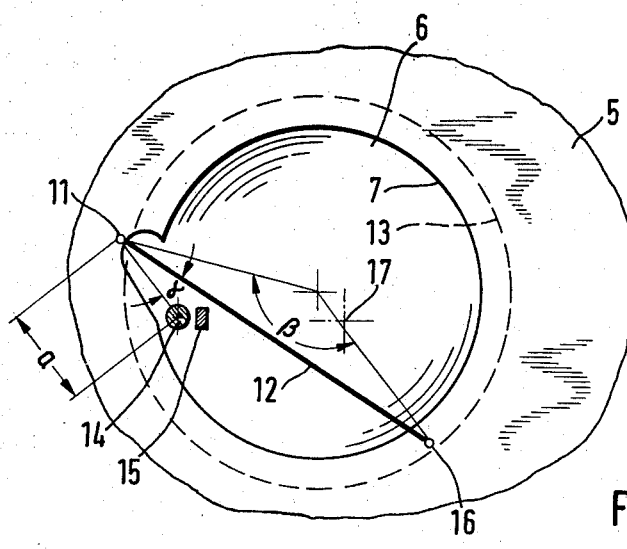
FIG. 2 is a plan view of the piston along a section II—II in FIG. 1.

FIG. 2 shows in particular the orientation of the fuel jet 12 in a plane which is perpendicular to FIG. 1. The electrodes 14, 15 extend into the combustion chamber 6 between the fuel jet 12 and the wall of the combustion chamber throat 7. The distance a of the axis of the center electrode 14 from the point where the injection nozzle axis penetrates the cylinder head bottom face is about from 25 to 30% of the maximum combustion chamber diameter D. In the plane which is shown in FIG. 2 perpendicular to the combustion chamber longitudinal axis x, the angle $\alpha$ between the fuel jet 12 emitted from the injection nozzle opening 11 and a straight line connecting the injection nozzle hole 11 with the axis of the electrode 14 is about 20° to 30° and the sector angle $\beta$ between the injection nozzle opening 11 and the jet impingement point 16 is about 150°.

Figure 3:
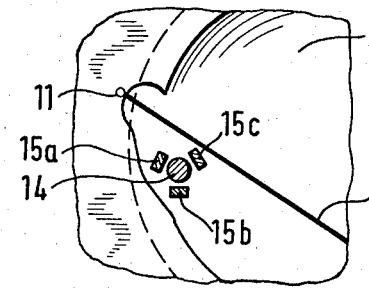
FIG. 3 is a partial view of FIG. 2, but with a differently designed ignition device.

The partial view shown in FIG. 3 illustrates the same configuration as FIG. 2, except that a different form of electrodes 14, 15 is provided. Whereas the center electrode 14 is unchanged, the ground electrode 15 consists of three individual electrodes 15a, 15b, 15c arranged around the center electrode 14 whereby reliable ignition is enhanced and the spark plug can be secured by means of the usual screw thread seeing that there is no need to maintain a defined angular position.

It is, of course, to be understood that the present invention is, by no means, limited to the specific showing in the drawings but also comprises any modifications within the scope of the appended claims.

What we claim is:

1. An air compressing internal combustion engine having ignition means which includes in combination: a cylinder, a cylinder head sealingly connected to said cylinder, a piston reciprocably arranged in said cylinder and provided with a combustion chamber open toward said cylinder head with the inner contour of said combustion chamber being that of a body of revolution, injection nozzle means arranged in said cylinder head and having a nozzle opening directed toward said combustion chamber so that the major portion of the fuel jet injected by said injection nozzle hits the wall of said combustion chamber, and ignition means so arranged in the region of said injection nozzle that at the top dead center position of said piston said ignition means extend into said combustion chamber near said injection nozzle opening both between the pass of the fuel jet ignited already when injected through said nozzle into said combustion chamber on one hand and then said combustion chamber wall on the other hand, the area of impingement of the fuel jet on the combustion chamber wall being located in the lower section of said combustion chamber, the combustion chamber being formed as a spherical combusion chamber having a flattened bottom and a constricted throat.

2. An engine in combination according to claim 1, in which the impingement area of the fuel jet on the combustion chamber wall is at a distance of from 10 to 15% of the maximum combustion chamber diameter below said diameter and in which viewed in a plane perpendicular to the longitudinal axis of said combustion chamber the angle at the center between said injection nozzle opening and the jet impingement area is from 145° to 160°.

3. An engine in combination according to claim 1, in which—viewed in a plane perpendicular to the longitudinal axis of said combustion chamber—the fuel jet emitted from the injection nozzle opening and the straight line connecting the injection nozzle opening with the electrode surrounded by said component electrodes are disposed at an angle of from 20° to 30° to each other.

4. An engine in combination according to claim 1, characterized in that the combustion chamber is arranged eccentrically with regard to the axis of said piston.

5. An engine in combination according to claim 1, in which said ignition means includes two rod electrodes arranged parallel to each other.

6. An engine in combination according to claim 1, in which one of said electrodes forming one pole of said ignition means comprises a plurality of component electrodes arranged around to other rod electrode forming the other pole.

7. An engine in combination according to claim 1, in which the length of said ignition means extending into the combustion chamber at the top dead center position of said piston amounts to from 25 to 30% of the maximum combustion chamber diameter.

8. An engine in combination according to claim 1, in which the distance between the points where the axes of the ignition means and of the injection nozzle penetrate through the bottom face of said cylinder head amounts to from 25 to 30% of the maximum combustion chamber diameter.

* * * * *